US008401774B2

(12) United States Patent
Ravenscroft et al.

(10) Patent No.: US 8,401,774 B2
(45) Date of Patent: Mar. 19, 2013

(54) SYSTEM AND METHOD FOR DETECTING AND PREVENTING RUNWAY INCURSION, EXCURSION AND CONFUSION

(75) Inventors: Donald L. Ravenscroft, Broomfield, CO (US); James P. Verbeke, Castle Rock, CO (US); Karl C. Pschierer, Ochsenfurt (DE)

(73) Assignee: The Boeing Company, Chicago, IL (US)

( * ) Notice: Subject to any disclaimer, the term of this patent is extended or adjusted under 35 U.S.C. 154(b) by 411 days.

(21) Appl. No.: 12/358,759

(22) Filed: Jan. 23, 2009

(65) Prior Publication Data

US 2010/0191450 A1 Jul. 29, 2010

(51) Int. Cl.
*G06F 19/00* (2011.01)
*G08G 1/16* (2006.01)

(52) U.S. Cl. .......... 701/120; 701/301; 701/14; 701/117; 340/461

(58) Field of Classification Search .................. 701/120, 701/14; 340/972, 961
See application file for complete search history.

(56) References Cited

U.S. PATENT DOCUMENTS 4,538,230 A * 8/1985 Reust et al. .................. 701/8
4,646,244 A * 2/1987 Bateman et al. .............. 701/301
5,208,591 A * 5/1993 Ybarra et al. ................ 340/961
5,488,563 A * 1/1996 Chazelle et al. .............. 701/301
5,892,462 A * 4/1999 Tran ........................ 340/961
6,926,235 B2 8/2005 Ouellette et al.
7,587,278 B2 * 9/2009 Poe et al. ................... 701/301
2002/0069019 A1 * 6/2002 Lin ......................... 701/301
2004/0128096 A1 * 7/2004 Luo ......................... 702/96
2005/0015202 A1 1/2005 Poe et al.
2007/0299598 A1 12/2007 Fetzmann et al.
2008/0186207 A1 * 8/2008 Fetzmann et al. ............ 340/972
2009/0201190 A1 * 8/2009 Huthoefer et al. ............ 342/27
2010/0070115 A1 * 3/2010 Villaume .................... 701/18

FOREIGN PATENT DOCUMENTS

WO WO2007/093698 8/2007

OTHER PUBLICATIONS

Christoph Vernaleken; Concept for an onboard runway incursion alerting system based on emerging advanced traffic surveillance technologies; SPIE Defense & Security 2008; Orlando FL.
ACSS News release, SafeRoute Certification for Class II EFBs Submitted to FAA, Aug. 26, 2008, not known if patent exists.
Ludwig, Diane, "Direct Alerting to the Cockpit for Runway Incursions," Mitre-CAASD, 2007 IEEE, McLean, VA.
Extended European Search Report for corresponding Application No. 10151471.9-1232/2211324 dated Aug. 10, 2011, 9 pages.

* cited by examiner

*Primary Examiner* — Thomas Black
*Assistant Examiner* — Sara Lewandroski
(74) *Attorney, Agent, or Firm* — Harness, Dickey & Pierce, P.L.C.

(57) ABSTRACT

A method for predicting the occurrence of an undesired operating event for a mobile platform operating within a designated area. The method may involve obtaining a plurality of parameters including a position of the mobile platform within the designated area for determining a kinematic motion of the mobile platform while the mobile platform is operating within the designated area. Information may also be obtained that relates to surface geometry of the designated area. The information related to surface geometry may be used to determine physical constraints within the designated area that limit operation of the mobile platform within the designated area. The plurality of parameters may be used to determine a kinematic motion of the mobile platform within the designated area. The kinematic motion of the mobile platform and the physical constraints may be used to predict if motion of the mobile platform will cause it to incur an undesired operating event.

8 Claims, 2 Drawing Sheets

SYSTEM AND METHOD FOR DETECTING AND PREVENTING RUNWAY INCURSION, EXCURSION AND CONFUSION

FIELD

The present disclosure relates to systems and methods for monitoring the traffic of vehicles in a predetermined area, and in one example to a system and method for monitoring and predicting incursion, excursion and confusion events of airborne mobile platforms while same are operating on the ground at an airfield or airport.

BACKGROUND

The statements in this section merely provide background information related to the present disclosure and may not constitute prior art.

At present there is a growing interest in monitoring the operation of airborne mobile platforms, for example commercial aircraft, while such aircraft are on the ground operating at an airport or airfield, leaving the airport during a take-off or approaching the airport during a landing operation. The International Civil Aviation Organization identifies a runway incursion as "any occurrence at an aerodrome involving the incorrect presence of an aircraft, vehicle or person on the protected area of a surface designated for the landing and take-off of aircraft." The FAA has adopted the ICAO definition as "any unauthorized intrusion onto a runway, regardless of whether or not an aircraft presents a potential conflict." In addition, the FAA defines an "Excursion" as when "an aircraft uncontrollably leaves a runway end, or side, usually during landing, but also during takeoffs, especially following an abort." A "Confusion" incident is defined as an incident involving a single aircraft when the aircraft makes "the unintentional use of the wrong runway, taxiway, or airport surface for landing or take-off."

As such, monitoring is important to prevent accidental incursions, excursions and confusion when multiple aircraft are attempting to use runways or taxi areas. Such systems attempt to provide timely advisories to the flight crew during taxi, takeoff, final approach, landing and rollout. This added situational awareness helps pilots avoid runway incursion and other kinds of on-ground accidents.

Limitations of solutions for monitoring and detecting incursions and excursions of aircraft at an airport include creation of excessive false alerts for possible incursion detection. Furthermore, all possible incursions may not be covered and are geometry constrained to provide only limited prediction of incursions based on speed or time (first order effects). For example, solution performance parameters presently being considered by the FAA SC-186 WG 1 committee are based on geometric airport surface relationships and arbitrarily chosen rules, boundaries, and performance attributes. For example a runway is assumed to be a 3-D box that extends three miles beyond the ends of the runway, 600-1500 feet to the sides of the runway centerline and 1000 feet above the runway surface. Only aircraft reported in the box are analyzed and aircraft movement within the box is estimated by either time to an event or speed (not velocity or acceleration) of an aircraft.

Solutions may not take into account actual aircraft dynamics or are restricted to collisions (not excursions), and are totally dependent on the airport surface geometry for calculating incursion potential. Still further, solutions that attempt to monitor and detect aircraft incursions and excursions are often scenario based and in many cases rely on the completeness of scenarios to judge whether incursions may or may not happen.

SUMMARY

In one aspect the present disclosure relates to a method for predicting the occurrence of an undesired operating event for a mobile platform operating within a designated area. The method may comprise: obtaining a plurality of parameters including a position of the mobile platform within said designated area for determining a kinematic motion of the mobile platform while the mobile platform is operating within the designated area; obtaining information related to surface geometry of the designated area; using the information related to surface geometry to determine physical constraints within the designated area that limit operation of the mobile platform within the designated area; using the plurality of parameters to determine a kinematic motion of the mobile platform within the designated area; and using the kinematic motion of the mobile platform and the physical constraints to predict if motion of the mobile platform will cause the mobile platform to incur an undesired operating event.

In another aspect the present disclosure may relate to a method for predicting the occurrence of an undesired operating event for a mobile platform operating within a designated area. The method may comprise: obtaining and using a plurality of operating parameters of the mobile platform to determine a kinematic motion of the mobile platform while the mobile platform is operating within the designated area; obtaining and using a plurality of operating parameters of a vehicle operating within the designated area, and remote from the mobile platform, to determine a kinematic motion of the vehicle; obtaining information related to surface geometry of the designated area; using the information related to surface geometry to determine physical constraints within the designated area that limit operation of at least one of the mobile platforms and the vehicle within the designated area; using the kinematic motions of the mobile platform and the vehicle, and the physical constraints, to predict the occurrence of an undesired operating event involving the mobile platform and the vehicle; and generating an alert to one of an individual on-board the mobile platform and a facility remote from the mobile platform when the undesired operating event is predicted to occur.

In another aspect the present disclosure relates to a system for monitoring operation of a mobile platform within a designated operating area and predicting the occurrence of an undesired operating event. The system may comprise: a database on-board the mobile platform for containing information useful for determining kinematic motion of the mobile platform within the designated operating area; a database remote from the mobile platform for containing information relating to physical characteristics of the designated operating area; an information source remote from the mobile platform for supplying position information concerning the mobile platform; and a processor carried on-board the mobile platform for obtaining information from the database on-board the mobile platform, the database remote from the mobile platform and the information source to predict the occurrence of the undesired operating event.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
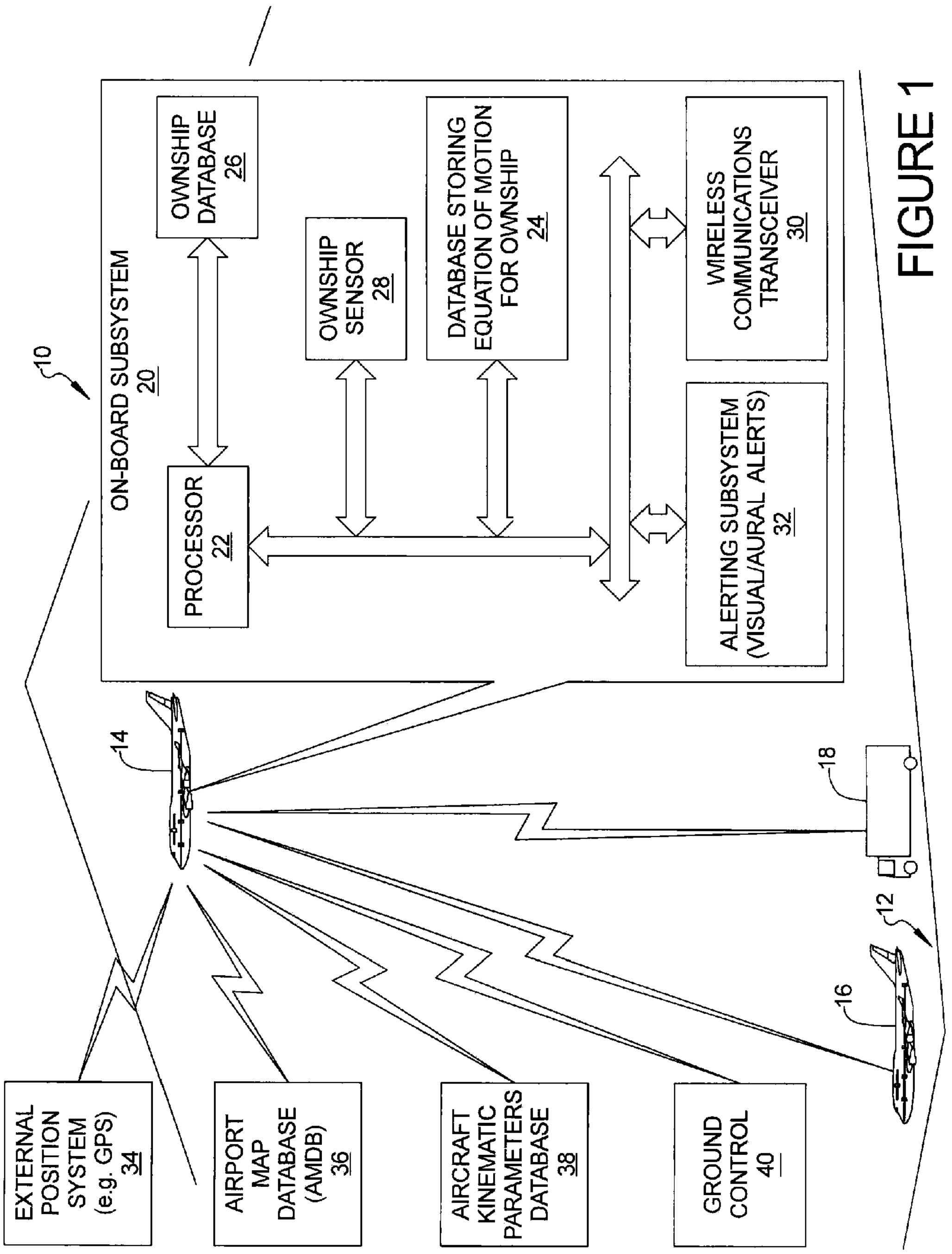
FIG. 1 is a block diagram of a system in accordance with one embodiment of the present disclosure.

The following description is merely exemplary in nature and is not intended to limit the present disclosure, application, or uses. It should be understood that throughout the drawings, corresponding reference numerals indicate like or corresponding parts and features.

Referring to FIG. 1, in one embodiment, there is shown a system 10 for predicting incursion, excursion and confusion events, as well as other events that may rise to confusion between multiple vehicles, all of which are operating at a designated area. For convenience, the system 10 for predicting incursion and excursion events will simply be referred to throughout as the "system 10", and the reference to incursion, excursion and confusion events may be referred to collectively as "undesired operating events". And while the system 10 will be described in the following discussion as being used at an airport, it will be appreciated that any other designated area, for example, a warehouse, factory, manufacturing plant, shipping/receiving port, etc., where multiple vehicles are operating could potentially make use of the system 10. Thus, it will be appreciated that the system 10 is not limited to use with only aircraft but could be employed for use with busses, cars, trucks, marine vehicles, trains, rotorcraft, and even space vehicles.

In this example the designated area is shown as airport 12 and a mobile platform 14, which will be referred to throughout as "aircraft 14", and may also be termed as the "ownship", is operating within the airport 12 boundary. The "boundary" in this instance is not limited to the airport physical boundary but also includes the airspace used for approach and takeoff or any other airspace within close proximity of the airport. The aircraft 14 may be operating on the ground, such as on a runway or taxiway, or parked at a gate during boarding or de-planeing. The aircraft 14 may also be approaching a runway during a landing operation or moving down a runway during a take-off operation. Essentially any type of operation of the aircraft 14 within the boundaries of the airport 12 is considered to be within the scope of the present disclosure.

At the airport 12 typically other vehicles, such as other aircraft 16, and various ground vehicles 18, are also operating within the boundaries of the airport. Such ground vehicles may be baggage transport vehicles, refueling vehicles, security or fire safety vehicles, etc. Often dozens or more vehicles (both aircraft and ground vehicles) will be moving about simultaneously at the airport 12. As will be appreciated, this can make for a challenging scenario as far as managing and monitoring movement of the various vehicles so that no undesired events or encounters take place. An "undesired event" or "undesired encounter", as used herein, may mean an "incursion", an "excursion", or a "confusion event". A runway incursion may involve two or more vehicles coming within an unacceptably close proximity to one another on a runway surface, or one vehicle entering an area of the airport 12, for example a runway, where it is not permitted. An excursion may involve any vehicle uncontrollably leaving a designated area where it is expected to be operating, for example an aircraft leaving a runway and entering a grassy area adjacent to the runway. A confusion event could be an aircraft taking off from a taxiway or the wrong runway. All of these events may be termed for simplicity an "undesired event".

The system 10 involves an on-board subsystem 20 that is carried on the aircraft 14. The on-board subsystem 20 may comprise a processor 22, a database 24 for storing equations of motion of the ownship, an ownship database 26, ownship sensors 28, a wireless communications transceiver 30 and a visual/aural alert subsystem 32. In this example the reference to "ownship" simply means equipment or operating parameters that are dedicated to the aircraft 14.

The ownship database 26 is used to store kinematic parameters that are required to calculate the kinematic motion (i.e., acceleration (a), velocity (v), displacement (s) and time (t)) of the aircraft 14. Some of this information may be obtained from the ownship sensors 28 (e.g., vehicle, speed, heading, etc.) that are carried on the aircraft 14. Database 24 may contain the equations of motion for the aircraft 14. Such equations involve one or more polynomials expressing the relationship between time (t) and displacement (s) of the aircraft 14, as well as its acceleration in terms of time, displacement and velocity (e.g., a=f(t); a=f(s) or a=f(v)). Zammit-Mangion (*Journal of Aircraft*, Vol. 45, No. 4, July 2008, "Simplified Algorithm to Model Aircraft Acceleration During Takeoff", hereby incorporated by reference into the present application) provide a simplified acceleration set of equations for predicting aircraft motion and time during take-off. Similarly, Byung J. Kim, *Transportation Research Record* 1562, p. 53, hereby incorporated by reference, provides equations for modeling aircraft landing performance.

The wireless communications transceiver 30 may be used to obtain additional information needed or helpful in predicting incursion or excursion events, for example information on the real time position of the aircraft 14 from an external position system 34 such as a GPS satellite. The transceiver 30 may also be used to wirelessly access an airport map database 36 that contains a detailed map of the airport 12 ground surface including runways, taxiways, buildings, etc. Still further, the transceiver 30 may be used to access and obtain information from an aircraft kinematic parameters database 38 that provides real time kinematic parameter information concerning the movement (i.e., velocity and/or acceleration) of all other vehicles operating within the airport 12 boundary. The transceiver 30 may also be used to wirelessly communicate with the ground control tower 40 to obtain any other information that may be useful to the on-board subsystem 20 in predicting an incursion, an excursion or a confusion event such as runway and taxiway closures or changes, runway conditions (weather or construction related), and taxi-way instructions. Any incursions, excursions or confusion events that the processor 22 predicts may be indicated to the crew members of the aircraft 14 via an alerting subsystem 32. The alerting subsystem 32 may include one or more visual and/or aural alerts that apprise the crew members (e.g. pilot and/or co-pilot) of a predicted, impending incursion, excursion or confusion event involving the aircraft 14.

Figure 2:
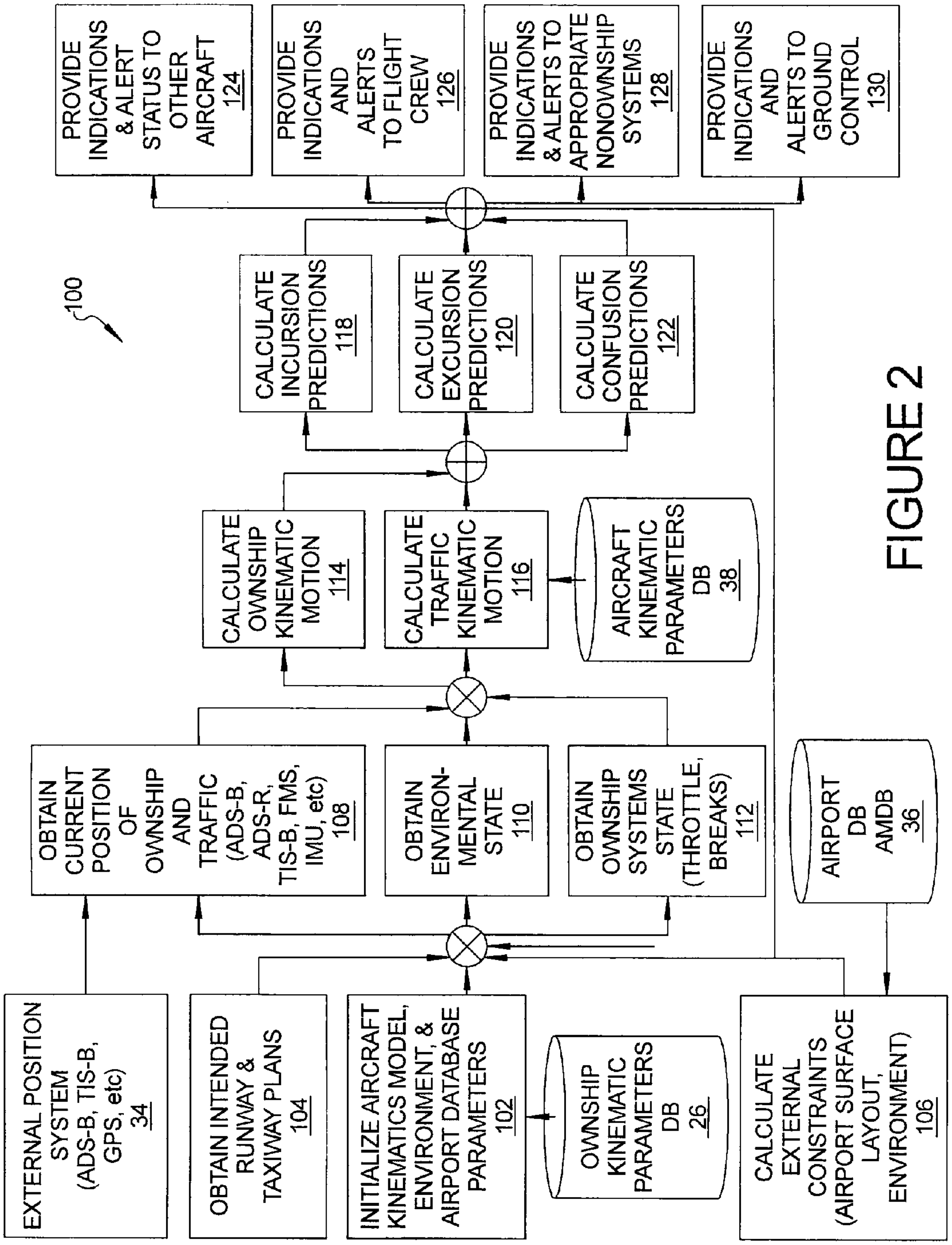
FIG. 2 is a flow diagram illustrating operations that may be performed by a method of the present disclosure in predicting an undesired operating event for a mobile platform operating within a designated area.

Referring now to FIG. 2, a flow diagram 100 is shown illustrating various operations that may be performed by the on-board subsystem 20 in monitoring and predicting an undesired event (i.e., excursion, incursion or confusion event). At operation 102 the processor 22 may initialize the on-board subsystem 20 using the ownship database 26. This operation provides the kinematic parameters (e.g., aircraft 14 acceleration, velocity, displacement and time) needed to calculate kinematic motion. At operation 104 the processor 22 may obtain the updated current taxi and take-off plan from the ground control 40. At operation 106 the processor 22 may calculate external constraints, for example surface geometry of the airport 12, using information obtained from the airport map database 36. For example, traffic (i.e., other aircraft or land vehicles) on nonadjacent surfaces that do not lead to a surface adjacent the aircraft 14 in less than one intersection may not be considered "traffic of interest" because at least two turns would be required by the traffic to intercept the aircraft 14. Another way of describing this is that all traffic of interest, relative to the aircraft 14, may be thought of as any traffic (i.e., any other aircraft or vehicle) that in one turn or less would result in rectilinear motion potentially causing a collision with the aircraft 14.

At operation 108 the processor 22 may obtain the current (i.e., real time) position of the aircraft 14 from the external position system 34. The processor 22 may also obtain information from the ground control tower 40 or another source concerning the environmental conditions affecting a designated area. For example, the environmental condition may be for the ground surface at the airport 12, as indicated at operation 110. The processor 22 may also obtain from the ground control tower or another source, information concerning at least one operating parameter of a vehicle remote from the aircraft that is present in a designated area. For example, information may be obtained relating to the position of the vehicle in the designated area and a speed of travel of the vehicle. The processor 22 may also obtain information on the state of one or more of the ownship sensors 28 (e.g., throttle, brakes, etc.), as indicated at operation 112.

At operation 114 the processor 22 may use the information obtained or calculated at operations 102-112 to calculate the kinematic motion of the aircraft 14. At operation 116 the processor 22 may use information obtained from the aircraft kinematic parameters database 38 to calculate the kinematic motion for all traffic of interest. Information obtained or calculated at operations 102-112 may also be used at operation 116. It will be appreciated that such "traffic of interest" may involve other aircraft, such as aircraft 16 shown in FIG. 1 or any other vehicles, such as land vehicle 18 in FIG. 1, that are operating at the airport 12.

Essentially in parallel with operations 114 and 116, the processor 22 may calculate incursion possibilities (i.e., predictions) at operation 118. In one embodiment, the processor 22 may use the kinematic motion of the aircraft 14 and other physical constraints to predict if the travel of the aircraft 14 will result in the aircraft coming into unacceptably close proximity to another vehicle in a designated area. This operation may involve the processor 22 using the kinematic equations of motion stored in database 24, its own position as obtained from an external information system (e.g., system 34), and the kinematic motion of all traffic of interest determined at operation 116, to predict if the aircraft 14 has a probability of colliding with any other vehicle falling with the scope of traffic of interest. A collision may be defined as the point when the predicted motion of the aircraft 14 as determined by the processor 22 coincides with a target to within a predetermined distance or time, for example within 0 to 3 meters or within 0 to 5 seconds). The distance and time are two example parameters that can be used to determine the boundary beyond which an incursion is defined to happen. The values are operationally changeable based on desired operations. The worst case is an actual impact where time and distance are both 0. Any such condition may be considered as an incursion. Of course, the calculations performed by the processor 22 at operation 118 may also result in no incursions being predicted.

At operation 120, which may be performed in parallel or essentially in parallel with operation 118, the processor 22 calculates excursions by checking if the predicted kinematic motion of the aircraft 14 will result in it leaving the runway or any other portion or region of the airport 12 in an uncontrolled fashion. Alternatively, an excursion may be thought of broadly as the aircraft 14 deviating from an accepted path of travel. As one example, the term "uncontrolled" may be thought of as leaving the surface of a runway at a location that does not lead to subsequent motion of the aircraft 14 on an open and operating airport surface as defined in the airport map database 36. For example, in one embodiment, the processor may predict if at least one path of travel and a speed of travel of the aircraft will cause the aircraft to deviate from an acceptable operating area within a designated area. Specific examples of excursions may comprise the aircraft 14 running off the end of a runway at the airport 12, the aircraft moving onto a closed surface area of the airport 12, or the aircraft 14 running onto the shoulder or non-apron (i.e., grass or dirt) area at the airport 12.

At operation 122, which may be performed in parallel, or essentially in parallel, with operations 118 and 120, the processor 22 may perform additional calculations to determine if a confusion event may be about to develop involving the aircraft 14, in view of the aircraft's 14 direction and/or speed of travel. As one example, the processor 22 may calculate the position of the aircraft 14 to see if the aircraft 14 is on the intended airport 12 surface area. The intended surface area may be defined by the airport runway and taxiway plans obtained at operation 104. Alternatively, the intended surface area may be determined by the processor 22 by comparing the aircraft's 14 heading to the direction of the runway derived from the information obtained from the airport map database 36. If the aircraft 14 is not on a planned surface while taxiing or the aircraft's 14 heading is not within a predetermined deviation from the planned runway heading once the aircraft is on the runway, then it may be deduced that a confusion event is in progress or is imminent. This can also happen on approach by the aircraft 14 to the airport 12 if the heading and/or predicted heading based on kinematics of the aircraft 14 does not line up with the planned runway.

The calculations determined at operations 114, 116, 118, 120 and 122 may preferably be performed at a frequency rapid enough to ensure that incursion, excursion and confusion events are not missed. The frequency at which such calculations may be performed may be dependent on the speed of the aircraft 14, or it may simply be set at a frequency of repetition (e.g., every 20 milliseconds) that would be clearly sufficient to take into account the speed of an aircraft approaching a runway or leaving a runway. It will be appreciated that in any event, the frequency of repetition may be selected to so that the calculations determined by the processor 22 are essentially real time calculations that provide sufficient reaction time for the crew of the aircraft 14 to address the incursion, excursion or confusion event, should any one of such events be predicted by the system 10.

At operations 124-130, the processor 22 may provide an alert to other aircraft or vehicles operating at the aircraft when an incursion, excursion or confusion event is predicted, via wireless signals from its communications transceiver 30 (operation 124). The processor 22 may also provide an alert to the flight crew (operation 126) via the alerting subsystem 32, and/or provide alerts to other subsystems off-board the aircraft 22, for example subsystems at the ground control tower 40, or directly to ground control personnel (operation 130). The alerts provided at operations 124-130 may include appropriate information such as the estimated time to a specific event (e.g., collision), the distance from the predicted event (e.g., distance to collision with another aircraft or vehicle), estimated impact velocity, surface identifiers (e.g. taxiway and runway names—such as M or 12 L), as well as identifications of the aircraft 14 itself and the other vehicle(s) involved in the predicted undesired event.

The system 10 provides a number of significant advantages of pre-existing systems used to monitor/predict incursions, excursions and confusion events at airports. The system 10 may provide increased accuracy, more timely alerting, and may be less susceptible to generating false alerts. Importantly, the system 10 accounts for all possible incursion/excursion/confusion events involving all types of vehicles at an airport, and not just other aircraft. The system 10 uses the airport map database 36 to restrict incursion possibilities to those that are physically reasonable due to airport design and surface layout, and not as a primary mechanism for collision detection/prediction. The system 10 also may be used to predict incursions and excursions for vertical and horizontal take-off and landing for virtually any type of aircraft, which many preexisting systems are unable to do reliably.

The system 10 advantageously operates to predict incursion/excursion/confusion events based on physics first principles and equations of motion, rather than primarily from airport maps. The system 10, however, may make use of an airport map to account for the surface layout of an airport and to reduce the time and complexity of the incursion/excursion/confusion event calculations performed by the processor 22. The system 10 may be especially valuable when used in closely spaced approach and departure situations (i.e., multiple aircraft on or approaching the runway) to accurately predict incursion/excursion/confusion events.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for predicting the occurrence of an undesired operating event for a mobile platform operating within a designated area, the method comprising:

obtaining and using a plurality of operating parameters of said mobile platform to determine a kinematic motion of said mobile platform while said mobile platform is operating within said designated area, said kinematic motion including a heading, a velocity and an acceleration, and wherein the acceleration is determined from variables relating to a displacement of said mobile platform, a time over which said mobile platform travels, and a velocity of said mobile platform;

wirelessly obtaining and using a plurality of real time operating parameters of a vehicle operating within said designated area;

accessing a database of kinematics information remote from said mobile platform to determine a kinematic motion of said vehicle, wherein said kinematic motion of said vehicle includes a heading, a velocity and an acceleration of said vehicle;

obtaining information related to surface geometry of said designated area;

using said information related to surface geometry to determine physical constraints within said designated area that limit operation of at least one of said mobile platform and said vehicle within said designated area, and wherein said physical constraints include considering whether said vehicle is travelling on a first surface which is non-adjacent to a second surface on which said mobile platform is travelling, and a number of turns required for said vehicle to reach said second surface;

using said kinematic motion of said mobile platform and said vehicle, and said physical constraints, to predict the occurrence of an undesired operating event involving said mobile platform and said vehicle; and generating an alert to one of an individual on-board said mobile platform and a facility remote from said mobile platform when said undesired operating event is predicted to occur.

2. The method of claim 1, wherein said predicting an undesired operating event involving said mobile platform and said vehicle comprises predicting an incursion involving said mobile platform and said vehicle, said incursion representing movement of said mobile platform and said vehicle into an unacceptably close proximity to one another.

3. The method of claim 1, wherein said predicting an undesired operating even involving said mobile platform and said vehicle comprises predicting an excursion involving one of said mobile platform and said vehicle, said excursion representing movement of one of said mobile platform and said vehicle to a location outside of an acceptable operating area within said designated area.

4. The method of claim 1, wherein said method of predicting the occurrence of an undesired operating event for a mobile platform comprises predicting the occurrence of an undesired operating event for an aircraft operating at an airport.

5. The method of claim 4, further comprising obtaining information relating to at least one of a take-off or a taxi plan for said aircraft.

6. The method of claim 1, wherein said obtaining and using a plurality of operating parameters for each of said mobile platform and said vehicle comprises obtaining real time position information for said mobile platform and said vehicle.

7. The method of claim 1, wherein said using said kinematic motions of said mobile platform and a speed and a vector of motion of said vehicle, and said physical constraints, to predict an undesired operating event involving said mobile platform and said vehicle, comprises updating said kinematic motion of said mobile platform and said speed and vector of motion of said vehicle repeatedly at a desired frequency.

8. A system for monitoring operation of a mobile platform within a designated operating area and predicting the occurrence of an undesired operating event, the system comprising:

a database on-board said mobile platform for containing information useful for determining kinematic motion of said mobile platform within a first area of said designated operating area, said kinematic motion including a heading, a velocity and an acceleration of said mobile platform; and wherein said acceleration is determined by a displacement of said mobile platform, a time over which said displacement occurs, and the velocity of said mobile platform;

at least one information source remote from said mobile platform for supplying position information concerning said mobile platform and a heading and a kinematic motion of a vehicle operating within a second area of said designated operating area, where the kinematic motion includes a displacement, velocity and acceleration of said vehicle; and a database remote from said mobile platform for containing information relating to physical characteristics of said designated operating area, including a number of turns required to travel between said first and second areas of said designated operating area;

a processor carried on-board said mobile platform for obtaining information from said database on-board said mobile platform, said database remote from said mobile platform and said information source to predict the occurrence of said undesired operating event.

* * * * *